United States Patent [19]

Lindberg

[11] Patent Number: 5,551,755
[45] Date of Patent: Sep. 3, 1996

[54] PADDED ARTICLE

[75] Inventor: Kenneth M. Lindberg, Holland, Mich.

[73] Assignee: Prince Corporation, Holland, Mich.

[21] Appl. No.: 289,660

[22] Filed: Aug. 12, 1994

[51] Int. Cl.[6] .................................................. A47C 7/54
[52] U.S. Cl. ...................... 297/411.46; 297/113; 297/115
[58] Field of Search .............................. 297/411.46, 113, 297/115, 188.04, 188.05, 188.06, 188.07, 188.15

[56] References Cited

U.S. PATENT DOCUMENTS

| | | | |
|---|---|---|---|
| 2,871,928 | 2/1959 | Swenson | 297/411.46 X |
| 3,630,823 | 12/1971 | Bonner, Jr. | 161/169 |
| 4,617,111 | 10/1986 | Grimm et al. | |
| 4,828,910 | 5/1989 | Haussling. | |
| 4,870,110 | 9/1989 | Mehra et al. | |
| 4,880,218 | 11/1989 | Greene. | |
| 4,906,044 | 3/1990 | Wilstermann | 297/113 X |
| 5,106,160 | 4/1992 | Nomura et al. | 297/115 X |
| 5,120,768 | 6/1992 | Sisson. | |
| 5,234,110 | 8/1993 | Kobler. | |
| 5,246,269 | 9/1993 | DeBoer et al. | 297/113 X |
| 5,252,614 | 10/1993 | Sisson. | |
| 5,280,066 | 1/1994 | Tekkanat et al. | |
| 5,312,848 | 5/1994 | Klapper et al. | |
| 5,395,161 | 3/1995 | Spykerman et al. | 297/411.46 X |

OTHER PUBLICATIONS

Exhibit A discloses an armrest manufactured by the assignee of the present application. The armrest includes a compartment defining support including a lid, a polyurethane foam cushion shaped to mateably engage the lid, and a sheet of fabric covering the lid and foam cushion.

Primary Examiner—Laurie K. Cranmer
Attorney, Agent, or Firm—Price, Heneveld, Cooper, DeWitt & Litton

[57] ABSTRACT

A vehicle armrest includes a support, a cushion attached to the support, and a sheet of material covering the support and cushion. The cushion is made from a mat of non-woven PET fibers, about 85% or more of which are from recycled post-consumer materials such as reground soft drink bottles and beverage containers. The remaining material of the mat are binder fibers made of an extrusion of high melt viscosity and low melt viscosity virgin PET material, which is also recyclable. The mat is compression molded, which provides heat and pressure to activate the binder fibers to permanently bind the fibers of the mat into a desired shape. The molded cushion includes pad sections having different thicknesses, shapes, and resilient properties, and further can include structural flanges that are substantially solid thermoplastic material. The structural flanges have bosses, attachment holes, ribs and contours as desired.

29 Claims, 3 Drawing Sheets

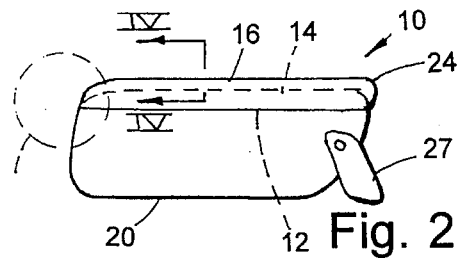
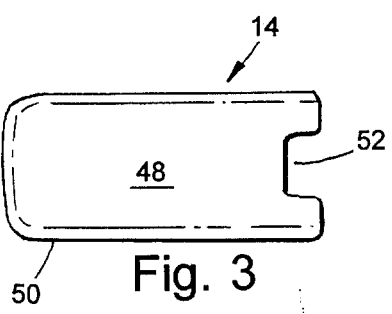
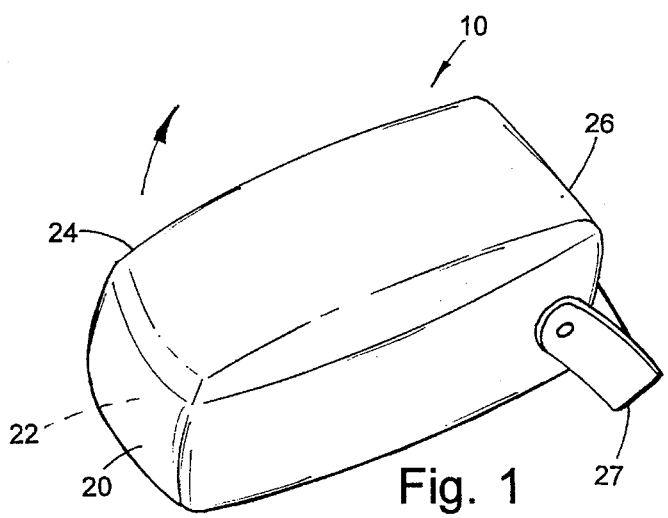
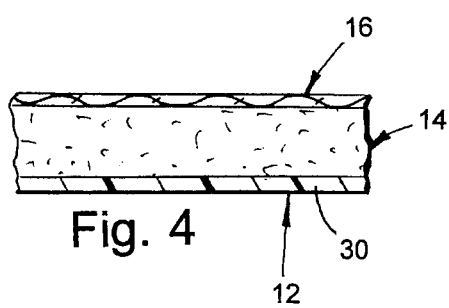
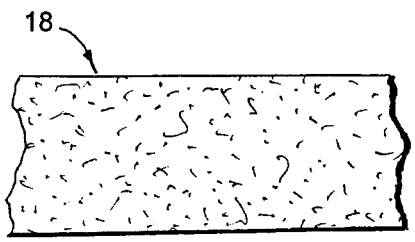
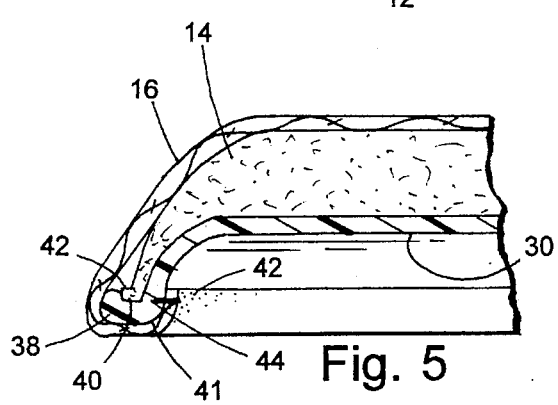
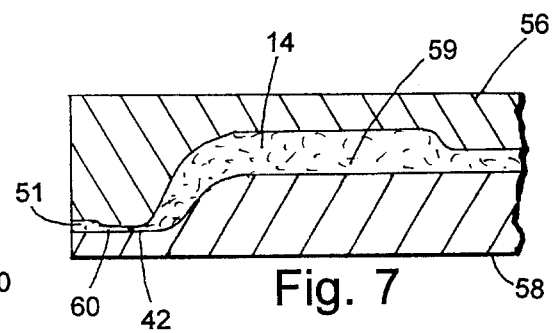
```
PREHEAT MAT IN OVEN
COMPRESSION MOLD MAT TO
FORM 3D PART
TRIM PART TO FORM CUSHION
ASSEMBLE ARMREST
```
Fig. 9
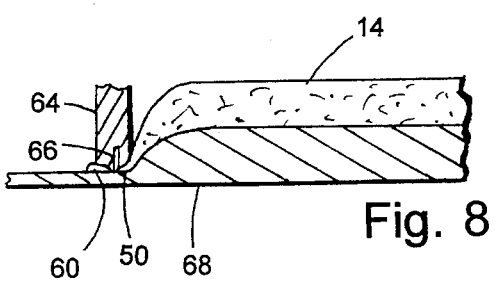

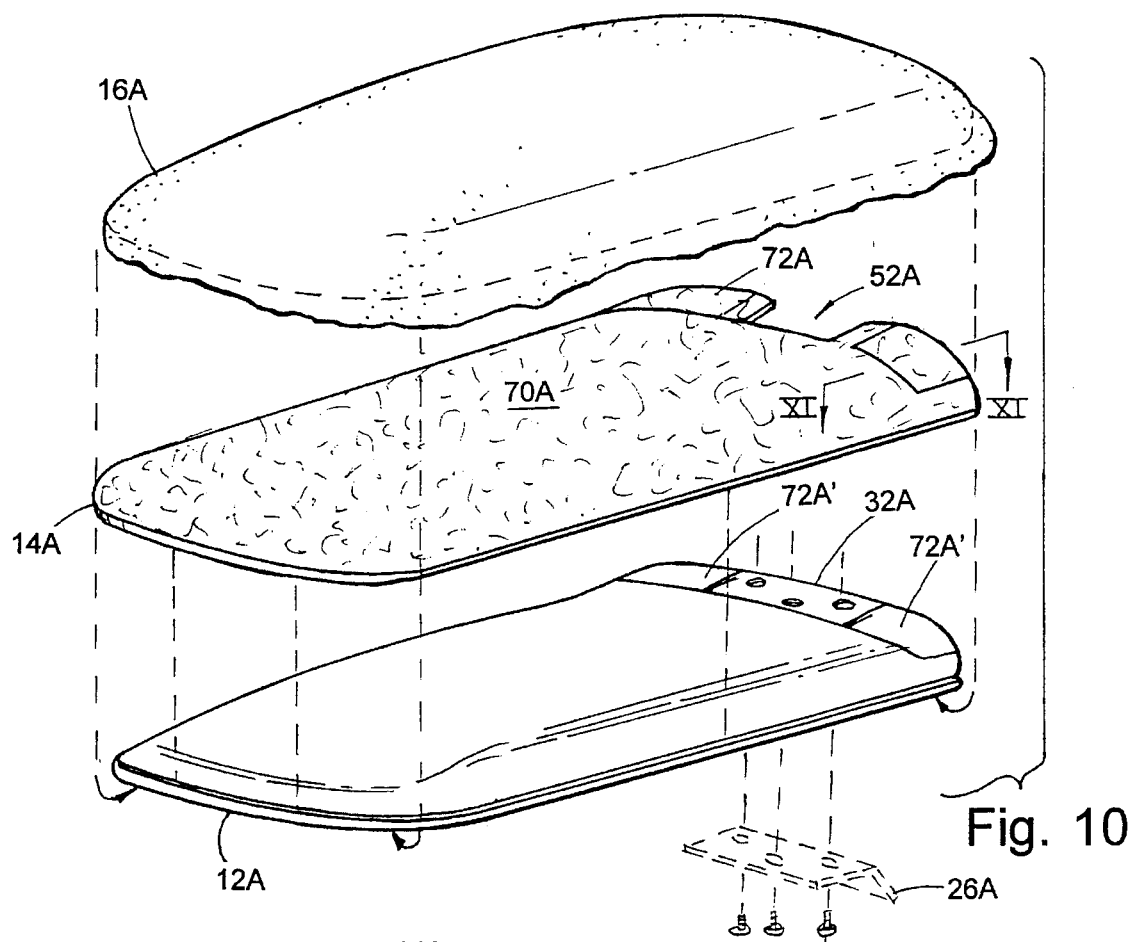
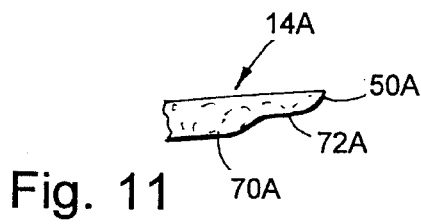
Fig. 11
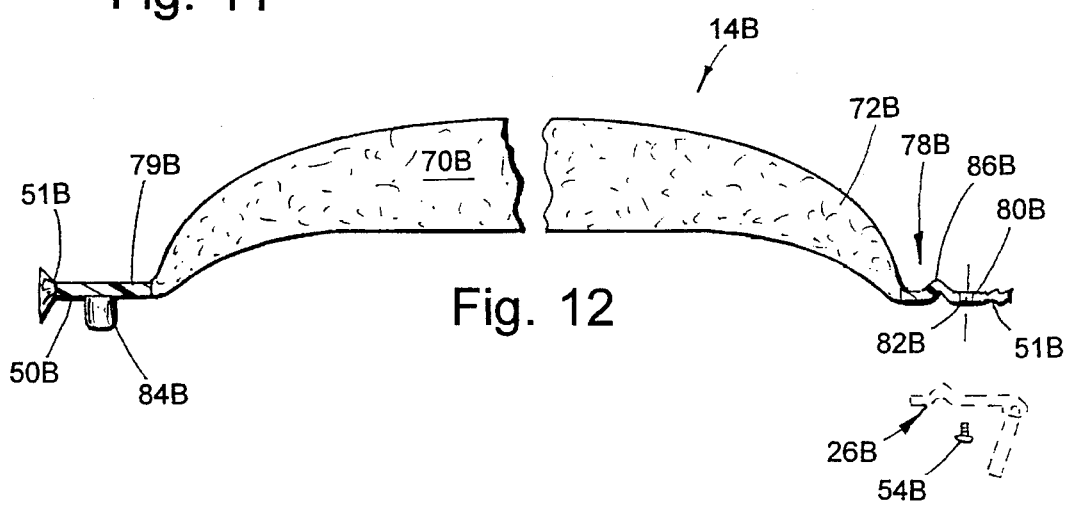
Fig. 12

PADDED ARTICLE

BACKGROUND OF THE INVENTION

The present invention relates to padded articles, and more particularly to an armrest including a cushion made from non-toxic recyclable fibrous material, although the invention is not limited to armrests.

Modern vehicles usually include a padded armrest located between the front vehicle seats. Traditional padded armrests for luxury vehicles include an elongated structural member, a resilient foam piece covering at least the top surface of the structural member, and an aesthetic sheet of vinyl, fabric or leather enclosing the structural member and the foam piece. Typically, the foam piece is made from urethane foam, however this material is expensive and toxic to mold, and further must be carefully molded to obtain a consistent foam density in a desired shape. Also, the polyurethane foam is a thermoset material that is not recyclable, and thus it cannot be reground, remelted and reused. Further, it is not economically feasible to selectively include molded-in padded sections having different densities and/or different resilient properties in the foam piece, nor is it economically feasible to make structural sections of solid, non-foamed plastic as integral molded-in parts of a foamed article. Thus, while the polyurethane can be molded into different shapes, it is not easy to mold-in-place localized stiffer sections nor integral attachment flanges.

Aside from the above, there is a tremendous problem of non-recyclable products that must be land-filled when they are disposed of. It is desirable to develop replacement products having equal or improved performance that utilize recyclable materials rather than non-recyclable materials.

Therefore, an article and method solving the aforementioned problems is desired.

SUMMARY OF THE INVENTION

The present invention includes an armrest for a vehicle having an elongated support configured to support a person's arm, a non-loam cushion comprising a mat of non-woven polymeric fibers mateably engaging the support to form a pad thereon, and a sheet of material covering the support and tile cushion. In one form, the fibers are made from polyethylene terephthalate, 85% of which are from recycled material such as reground soft drink bottles and beverage containers. In another form, the mat is compression molded to include sections having different densities and resiliencies. In yet another form, the mat is molded to include sections of substantially solid plastic having sufficient integrity to be used for securing the cushion to the support or for stably engaging locating structure on the support.

These and other features and advantages of the present invention will be further understood and appreciated by those skilled in tile art by reference to the following specification, claims and appended drawings.

BRIEF DESCRIPTION OF THE DRAWINGS

FIG. 1 is a perspective view of an armrest embodying the present invention;

FIG. 2 is a side view of tile armrest shown in FIG. 1;

FIG. 3 is a plan view of the bottom of a cushion shown in FIG. 1, the cushion being manufactured from a mat of non-woven recycled PET fibers;

FIG. 4 is an enlarged fragmentary cross-sectional view along lines IV—IV in FIG. 2;

FIG. 5 is an enlarged fragmentary cross-sectional view of the circled area in FIG. 2;

FIG. 6 is a fragmentary cross-sectional view of the mat before molding;

FIG. 7 is a fragmentary cross-sectional view of the mat taken while molding the cushion and illustrating use of compression molding dies to form the cushion;

FIG. 8 is a fragmentary cross-sectional view of the cushion taken while trimming the cushion and illustrating use of a steelrule trimming die;

FIG. 9 is a flow chart showing the process of manufacturing a padded article;

FIG. 10 is an exploded perspective view of a modified cushion embodying the present invention;

FIG. 11 is a fragmentary cross-sectional view taken along the lines XI—XI in FIG. 10; and FIG. 12 is a fragmentary cross-sectional view of a second modified cushion embodying the present invention.

DETAILED DESCRIPTION OF PREFERRED EMBODIMENTS

Figures 1A, 1B:
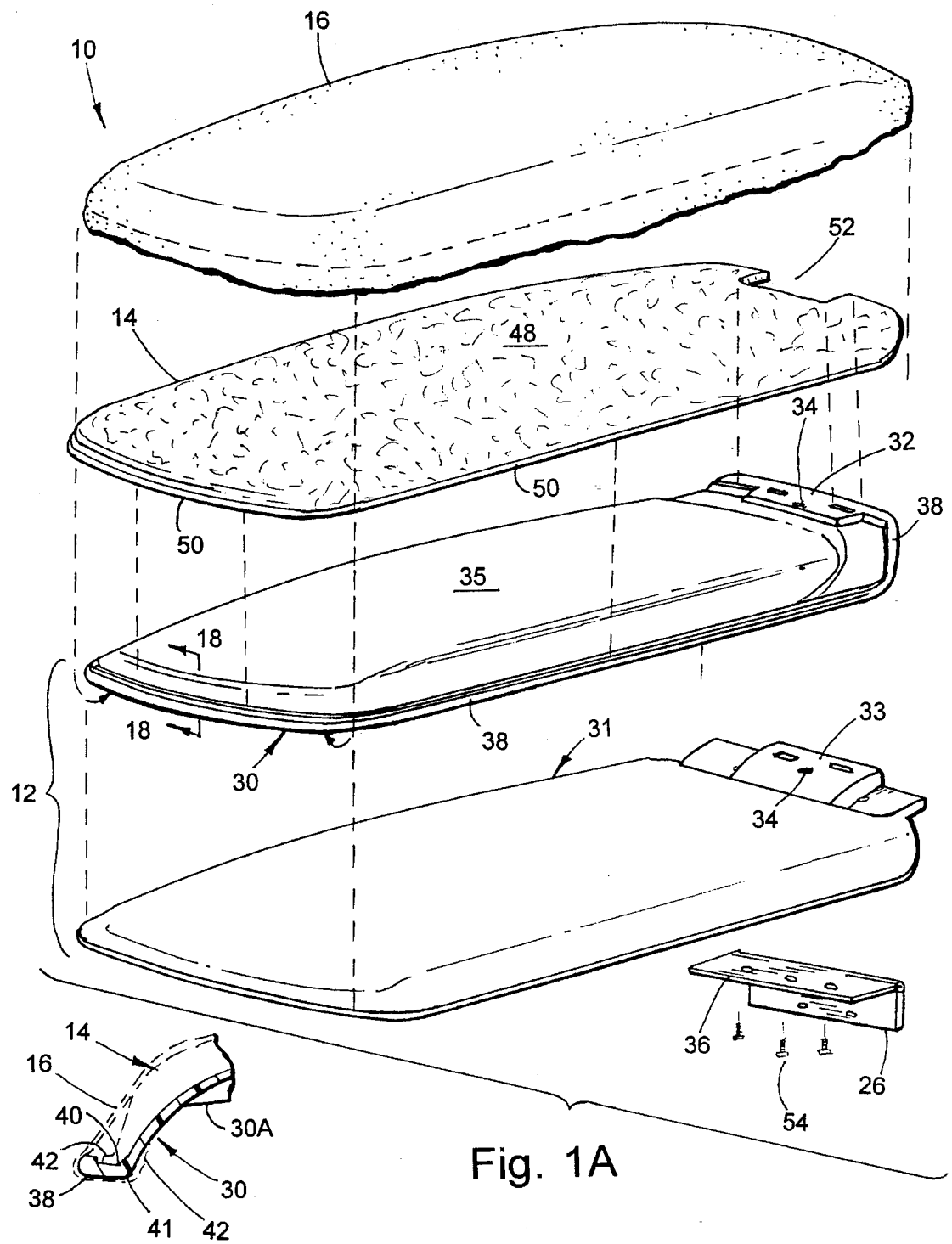
FIG. 1A is an exploded perspective view of the cover of tile armrest shown in FIG. 1.
FIG. 1B is a fragmentary perspective view taken along the lines 1B—1B.

For purposes of description herein, the terms "upper," "lower," "right," "left," "rear," "front," "vertical," "horizontal" and derivatives thereof shall relate to the invention as oriented in FIG. 1, with the front of the armrest being generally toward the left of the drawing. However, it is to be understood that the invention may assume various alternative orientations. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as unnecessarily limited.

A vehicle armrest or padded article 10 (FIG. 1A) embodying the present invention includes an elongated support 12 made from mating shell-like components 30 and 31, a non-foam cushion 14 attached to support 12, and a sheet of material 16, such as vinyl, fabric, or leather, having an aesthetic appearance. Cushion 14 is a three dimensional part made from a needled mat 18 (FIG. 6) of woven polyethylene terephthalate (PET) fibers, about 85% of which are recycled from reground beverage containers or soft drink bottles and the remainder of which are virgin PET fibers for binding the mat together in a predetermined shape during compression molding. Specifically, the mat is preheated in an oven, and then compression molded to shape the mat and bind the mat of woven PET fibers together as described below. Notably, the cushion 14 can be three dimensionally shaped, can include various sections having different densities, and can include strong well-defined flanges and/or edges for engaging the support and/or for attachment to the support. Advantageously, cushion 14 is made from recyclable PET material which can be reground and reused.

More particularly, the illustrated armrest 10 (FIG. 1) includes a base 20 defining an internal compartment 22 and a support or lid 24 for covering compartment 22 pivotally attached to base 20 by a hinge 26. Base 20 is adapted with a pivot bracket 27 to be pivotally connected to a vehicle for movement between a raised storage position and a lowered use position between the front seats of the vehicle. Hinge 26 (FIG. 1A) is attached to the upper rear of base 20 and the rear of lid 24 such that lid 24 can be pivotally opened and closed.

Support components 30 and 31 are made of structural polymer such as polypropylene. Each component 30 and 31 is a molded structure having a generally uniform thickness. Reinforcement ribs 30A (FIG. 1B) are included as required for rigidity. Mating structures 32 and 33 including holes 34 are provided at one end of support components 30 and 31 so that one leg 36 of hinge 26 can be securely attached to support 12. A continuous flange 38 (FIG. 5) extends around support 30. Flange 38 defines a channel 40 (FIG. 1B) for receiving an edge 50 of cushion 14, and further provides a surface 41 for engaging the marginal edges 42 of sheet 16. Edges 42 of sheet 16 can be mechanically fastened to surface 41 by staples 44 that extend through sheet edge 42 into the material forming flange 38, adhered by an adhesive or otherwise secured to support component 30 by methods known in the art. The top surface 35 of upper support component 30 defines an outwardly bulged space bounded by flange 38 and structure 32 for capturing cushion 14.

Cushion 14 is a three dimensional structure compression molded solely from the fibrous non-woven mat 18 (FIG. 6). The body of cushion 14 (FIG. 1A) is a pad forming section 48 that is about three quarters to one inch thick and has a density of about 40–100 ozs./ft.$^3$, and most preferably has a density of about 60 ozs./ft.$^3$. Portions of cushion 14 are made thinner and denser for integrity of cushion 14, such as near the marginal edges 50 of cushion 14 and near the cutout 52 in cushion 14 adjacent the location where hinge 36 attaches to support 30. For example, tile material of cushion 14 becomes relatively stiffer and begins to provide structural support at thicknesses of about a half inch or less and at densities of about 100 to 200 ozs./ft.$^3$. The edges 50 of cushion 14 are permanently compressed to a substantially solid mass during the compression molding process such that tile sections have a specific gravity of about 1.0 (i.e. nearly tile specific gravity of solid PET material). Thus, the edges 50 are strong and well-defined.

To assemble armrest 10, cushion 14 is positioned on support 30 with cutout 52 positioned adjacent hinge attachment structure 32 and edges 50 mateably nested in channel 40 of perimeter flange 38. Sheet 16 is then positioned on cushion 14 and attached to perimeter surface 41 of support 30. Hinge 26 is attached when desired with screws 54 that extend into holes 34 in support 30.

Mat 18 is a needled, non-woven (non-foamed) product purchased from Sackner Products of Grand Rapids, Mich. It is about 2 inches thick, has a density of about 10 to 26 ozs./ft.$^3$, and is comprised of PET fibers having a 5 denier. The first fibers are extruded from recycled reground polyethylene terephthalate (PET) material, such as beverage containers or soft drink bottles. The second fibers are virgin PET material including high melt and low melt components. The second fibers are adapted to bond the first fibers together during compression molding, as described below. The two fibers are needled together to form the mat 18, with the reground PET fibers being about 85% or more of the mat and the second fiber being about 15% or less. However, it is noted that different mat compositions can be used depending upon the application and the structural sections that need to be found. For example, it is contemplated that tile amount of PET fibers that are reground can be increased to up to about 100%, and that different binder materials can be used.

To manufacture cushion 14, a mat 18 is preheated to about 480° F. for 10 to 15 seconds in a preheat oven (FIG. 9). Mat 18 is then transferred to a compression molding station. A pair of aluminum dies 56 and 58 (FIG. 7) are provided which define a cavity 59 having a predetermined shape. Dies 56 and 58 are maintained at a temperature that will cool and stabilize the mat 18 after it is formed, such as at an ambient room temperature or somewhat above room temperature as dies 56 and 58 heat up during use. As dies 56 and 58 are brought together, mat 18 is compressed therebetween. Portions of dies 56 and 58 compress mat 18 tightly at about 100 psi for about 15 seconds causing the corresponding material in mat 18 to be compressed to substantially a solid mass of plastic PET material. The binder fibers cause the material to bond together, thus forming the three dimensional shape of cushion 14.

It is contemplated that a flange-like ring of structural solid plastic material 60 will be formed around the perimeter of cushion 14 during the compression molding process. This allows cushion 14 to be trimmed to include the well-defined edges 50 of cushion 14. For this purpose, a "steelrule" or "cookie cutter" type trimming die 64 is provided that includes steel blades 66 for cutting through ring 60 and against resilient backing member 68. Cutout 52 (FIG. 1A) is also formed by trimming die 64.

Modified cushions 14A and 14B are described hereinafter. To reduce redundant discussion, comparable features are described utilizing identical numbers but with the addition of tile letters "A" and "B", respectively.

MODIFICATIONS

Cushion 14A (FIGS. 10–11) includes a low density section 70A having a first resiliency, and a second density section 72A having a second resiliency higher and stiffer than the first resiliency. Notably, sections 70A and 72A can be located anywhere on cushion 14A in substantially any shape or size, with the exception that undercuts and deep draws are not possible unless multiple mats or non-planar mats are used. Cushion 14A includes a pair of sections 72A on opposing sides of cutout 52A to provide rigidity to cushion 14A around hinge (36). Sections 72A are extended at an angle and are not co-planar, such that sections 72A mateably positively engage corresponding surfaces 72A' on the support for cushion 14A. Thus, sections 72A locate cushion 14A on the corresponding support for cushion 14A.

Cushion 14B (FIG. 12) includes enlarged flanges 78B and 79B of substantially solid material along cushion edges 50B. Notably, flash 51B has not yet been trimmed from edges 50B as illustrated in FIG. 12. Flange 78B is substantially solid plastic, such that it has the structural properties approaching that of solid PET material. The flange 78B formed at one end of cushion 14B includes an enlarged panel 80B of solid plastic that rigidifies the hinge attachment area (see flat section 32A on support 12 in FIG. 1A). A V-shaped rib 86B is located on panel 80B to rigidify flange 78B, and attachment holes 82B are located in panel 80B for receiving hinge screws 54B. A second flange 79B at the opposite end of cushion 14B includes a boss 84B for receiving attachment screws or for engaging corresponding locating pins/structures on the support for cushion 14B.

Thus, there is provided a padded structure including a support, and a cushion made from a mat of non-woven polymeric fibers configured to engage the support and form a pad thereon. An armrest is formed by adapting the support for attachment to a vehicle, and by covering the cushion and support with a sheet of material having an aesthetic surface. Advantageously, the pad is recyclable and further is made from recyclable materials.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An armrest for a vehicle comprising:

an elongated support adapted for attachment to the vehicle, said support being configured to support the weight of a person's arm;

a non-foam cushion configured to mateably engage said support, said cushion engaging said support and comprising a mat of polymeric fibers forming a pad on said support, said cushion including a lower density section having a first resiliency and first and second higher density sections having a second resiliency different than said first resiliency, said first and second higher density sections being positioned on opposing sides of said cushion; and a sheet of material attached to said support covering said support and said cushion.

2. An armrest as defined in claim 1 wherein said support includes a flange extending around said support and defining a perimeter on at least three sides of said support, and wherein said cushion includes strong, well-defined marginal edges configured to mateably engage said flange.

3. An armrest as defined in claim 1 wherein said cushion is concavely-shaped and includes a contoured surface that extends in three dimensions for engaging said support.

4. An armrest as defined in claim 1 wherein said support includes a protruding portion, and wherein said cushion includes a perimeter having a cutout shaped to receive said protruding area.

5. An armrest as defined in claim 1 wherein said support includes locating structure, and said cushion includes a strong well-defined section configured to engage said locating structure.

6. An armrest as defined in claim 1 wherein said support includes an end having attachment structure, and said first and second higher density sections are positioned on opposing sides of said attachment structure.

7. An armrest as defined in claim 1 wherein said fibers are about 85% to 100% PET material.

8. An armrest as defined in claim 1 wherein said fibers are at least in part reground recycled polymeric material.

9. An armrest as defined in claim 8 wherein said fibers include from zero to about 15% virgin PET material which acts as a binder to hold said cushion together after forming said cushion.

10. An armrest as defined in claim 1 wherein the density of said pad section is at least about 40 ozs./ft$^3$.

11. An armrest as defined in claim 1 wherein said fibers include at least 85% reground material recycled from beverage containers and soft drink bottles.

12. An armrest as defined in claim 1 wherein said cushion includes a permanently compressed, strong, well-defined marginal edge configured to mateably engage said support.

13. An armrest as defined in claim 1 wherein said sheet of covering material is attached to said support and holds said cushion on said elongated support.

14. An armrest as defined in claim 13 wherein said covering material includes a fabric.

15. An armrest as defined in claim 1 wherein said cushion includes a third higher density section that forms attachment structure for attaching the cushion to the support.

16. An armrest as defined in claim 1 wherein said support includes locating structure, and said cushion includes a section of material extending from said pad for securing said cushion to said support.

17. An armrest as defined in claim 1 wherein said cushion defines a concave shape including a flange at one end, said flange being configured for attachment to said elongated support.

18. An armrest as defined in claim 1 including a base configured for attachment to the vehicle that defines an internal compartment and further wherein said support defines a lid for covering said internal compartment, said cushion being configured to cover a top surface of said lid.

19. An armrest as defined in claim 1 wherein the cushion comprises a recyclable thermoplastic material.

20. An armrest as defined in claim 1 wherein the support comprises a recyclable thermoplastic material.

21. An armrest for a vehicle comprising:

an elongated support adapted for attachment to the vehicle, said support being configured to support the weight of a person's arm;

a non-foam cushion configured to mateably engage said support, said cushion engaging said support and comprising a mat of polymeric fibers forming a pad on said support, said fibers including about 15% co-extruded fibers including a high melt viscosity PET virgin material and a low melt viscosity PET virgin material; and a sheet of material attached to said support covering said support and said cushion.

22. An armrest as defined in claim 21 wherein the cushion comprises a recyclable thermoplastic material.

23. An armrest as defined in claim 21 wherein the support comprises a recyclable thermoplastic material.

24. An armrest for a vehicle comprising:

an elongated support adapted for attachment to the vehicle, said support being configured to support the weight of a person's arm;

a non-foam cushion member configured to mateably engage said support, said cushion member including a cushion section engaging said support and comprising a mat of polymeric fibers forming a pad on said support, and further including a higher density attachment section having at least one boss; and a sheet of material attached to said support covering said support and said cushion.

25. An armrest as defined in claim 24 wherein the cushion section comprises a recyclable thermoplastic material.

26. An armrest as defined in claim 24 wherein the support comprises a recyclable thermoplastic material.

27. An armrest for a vehicle comprising:

an elongated support adapted for attachment to the vehicle, said support being configured to support the weight of a person's arm;

a non-foam cushion configured to mateably engage said support, said cushion engaging said support and including an integral structural flange having a hole therein for receiving a fastener to secure said cushion to said support, and further comprising a mat of polymeric fibers forming a pad on said support; and a sheet of material attached to said support covering said support and said cushion.

28. An armrest as defined in claim 27 wherein the cushion comprises a recyclable thermoplastic material.

29. An armrest as defined in claim 27 wherein the support comprises a recyclable thermoplastic material.

* * * * *